(12) United States Patent
Kim

(10) Patent No.: US 7,856,355 B2
(45) Date of Patent: Dec. 21, 2010

(54) SPEECH QUALITY ASSESSMENT METHOD AND SYSTEM

(75) Inventor: Doh-Suk Kim, Basking Ridge, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 639 days.

(21) Appl. No.: 11/172,965

(22) Filed: Jul. 5, 2005

(65) Prior Publication Data

US 2007/0011006 A1    Jan. 11, 2007

(51) Int. Cl.
*G10L 21/02*    (2006.01)

(52) U.S. Cl. ........................ 704/228; 702/69

(58) Field of Classification Search .................. 704/233
See application file for complete search history.

(56) References Cited

U.S. PATENT DOCUMENTS

| | | | | |
|---|---|---|---|---|
| 5,621,854 A * | 4/1997 | Hollier | ..................... | 704/200.1 |
| 5,778,336 A * | 7/1998 | Chou et al. | .................. | 704/222 |
| 5,784,406 A * | 7/1998 | DeJaco et al. | ............... | 375/224 |
| 5,794,188 A * | 8/1998 | Hollier | ........................ | 704/228 |
| 5,848,384 A * | 12/1998 | Hollier et al. | ............... | 704/231 |
| 6,035,270 A * | 3/2000 | Hollier et al. | ............... | 704/202 |
| 6,044,342 A * | 3/2000 | Sato et al. | ................... | 704/233 |
| 6,446,038 B1 * | 9/2002 | Bayya et al. | ................ | 704/232 |
| 6,490,552 B1 * | 12/2002 | Lee et al. | .................... | 704/209 |
| 6,609,092 B1 * | 8/2003 | Ghitza et al. | ............... | 704/226 |
| 6,697,776 B1 * | 2/2004 | Fayad et al. | ................. | 704/233 |
| 6,778,954 B1 * | 8/2004 | Kim et al. | ................... | 704/226 |
| 6,804,651 B2 * | 10/2004 | Juric et al. | ................... | 704/265 |
| 7,406,419 B2 * | 7/2008 | Malfait | ....................... | 704/270 |
| 7,606,704 B2 * | 10/2009 | Gray et al. | .................. | 704/226 |
| 2001/0000190 A1 * | 4/2001 | Oshikiri et al. | ............. | 704/233 |
| 2003/0171922 A1 * | 9/2003 | Beerends et al. | ............ | 704/233 |
| 2004/0002852 A1 * | 1/2004 | Kim | ........................ | 704/205 |
| 2004/0002857 A1 * | 1/2004 | Kim | ........................ | 704/222 |
| 2004/0078197 A1 * | 4/2004 | Beerends et al. | ............ | 704/225 |
| 2004/0153789 A1 * | 8/2004 | Fuchigami et al. | ............ | 714/25 |
| 2004/0158469 A1 * | 8/2004 | Brand | ........................ | 704/240 |
| 2004/0186715 A1 * | 9/2004 | Gray et al. | .................. | 704/236 |
| 2004/0267523 A1 * | 12/2004 | Kim | ........................ | 704/205 |
| 2005/0060155 A1 * | 3/2005 | Chu et al. | .................... | 704/269 |
| 2005/0141737 A1 * | 6/2005 | Hansen | ....................... | 381/316 |
| 2005/0143977 A1 * | 6/2005 | Malfait | ....................... | 704/205 |

(Continued)

FOREIGN PATENT DOCUMENTS

EP    1443496    8/2004

(Continued)

OTHER PUBLICATIONS

"An objective measure for predicting subjective quality of speechcoders", Wang, S., Sekey, A., Gersho, A., Jun. 1992.*

(Continued)

*Primary Examiner*—Talivaldis Ivars Smits
*Assistant Examiner*—Greg A Borsetti
(74) *Attorney, Agent, or Firm*—Harness, Dickey & Pierce

(57) ABSTRACT

In one embodiment, distortion in a received speech signal is estimated using at least one model trained based on subjective quality assessment data. A speech quality assessment for the received speech signal is then determined based on the estimated distortion.

14 Claims, 9 Drawing Sheets

U.S. PATENT DOCUMENTS

2006/0166624 A1* 7/2006 Van Vugt .................. 455/67.11
2008/0212567 A1* 9/2008 El-Hennawey et al. ...... 370/352

FOREIGN PATENT DOCUMENTS

| EP | 1443497 A1 * | 8/2004 |
|---|---|---|
| EP | 1492085 | 12/2004 |
| EP | 1492085 A2 * | 12/2004 |
| WO | WO 2004/003889 | 1/2004 |

OTHER PUBLICATIONS

"Perceptual evaluation of speech quality (PESQ)-a new method forspeech quality assessment of telephone networks and codecs", Rix, A.W., Beerends, J.G., Hollier, M.P., Hekstra, A.P., May 2001.*
"On the combined effects of signal-to-noise ratio and room acoustics on speech intelligibility", Bradley, J.S. , Reich, R.D., Norcross, S.G. Jun. 15, 1999.*
F. De Vito, D. Quaglia, and J. C. De Martin, "Model based distortion estimation for perceptual classification of video packets," in Proc. IEEE Workshop on Multimedia Signal Processing, Sep. 2004.*
J.C. de Martin, "Source-driven packet marking for speech transmission over differentiated-services networks," in Proc. Int'l Conf. Acoustics, Speech, and Signal Processing, Salt Lake City, UT, May 2001, IEEE.*
A.Rix, "Perceptual speech quality assessment—a review," Proceedings of ICASSP-2004, vol. 3, pp. 1056-1059, May 2004.*
D. S. Kim and A. Tarraf, "Perceptual model for non-intrusive speech quality assessment," in Proc. Int. Conf. on Acoust., Speech, Signal Processing, Montreal, QC, Canada, May 2004, pp. 1060-1063.*
D. S. Kim, "A cue for objective speech quality estimation in temporal envelope representations," IEEE Signal Processing Lett., vol. 11, No. 10, pp. 849-852, Oct. 2004.*
D. -S. Kim, O. Ghitza, and P. Kroon, "A computational model for MOS prediction," in Proc. IEEE Workshop Speech Coding Process., Jun. 1999, pp. 141-143. [33] Subjective performance.*
S. Voran, "Perception of temporal discontinuity impairments in coded speech—A proposal for objective estimators and some subjective test results," in Proc. 2nd Int. Conf. Measurement of Speech and Audio Quality in Networks (MESAQIN), Prague, Czech Republic, May 2003, pp. 37-46.*
D. S. Kim and A. Tarraf, "Perceptual model for non-intrusive speech quality assessment," in Proc. Int. Conf. on Acoust., Speech, Signal Processing Montreal, QC, Canada, May 2004, pp. 1060-1063.*
A. Clark, "Modeling the effects of burst packet loss and recency on subjective voice quality", Proc. of IP Telephony Workshop, Mar. 2001.*
Bayya, A. and Vis, Marvin (1996), "Objective measures for speech quality assessment in wireless communications", Proceedings of ICASSP 96, vol. 1, 495-498.*
L. Sun, E. Ifeachor, Perceived speech quality prediction for voice over IP-based networks, in: Proceedings of IEEE International Conference on Communications, IEEE ICC'02, New York, USA, Apr. 2002, pp. 2573-2577.*
"3SQM™ Advanced Non-Intrusive Voice Quality Testing" 2004.*
ITU-T p. 563 "Single-ended method for objective speech quality assessment in narrow-band telephony applications" May 2004.*
Sun. "Speech Quality Prediction for Voice Over Internet Protocol Networks" Jan. 2004.*
Mohamed et al. "Real-Time Audio Subjective Quality Assessment in Packet Networks" 2000.*
Liang, Jin et al. "Output-Based Objective Speech Quality." IEEE, 1994. pp. 1719-1723.
Jin, Chiyi et al. "Vector Quantization Techniques for Output-Based Objective Speech Quality." IEEE, 1996. pp. 491-494.
Gray, P. et al. "Non-intrusive speech-quality assessment using vocal-tract models." IEE Proc.-Vis Image Signal Process, vol. 147, No. 6, Dec. 2000. pp. 493-501.
Kim, Doh-Suk. "A Cue for Objective Speech Quality Estimation in Temporal Envelope Representations." IEEE Signal Processing Letters, vol. 11, No. 10, Oct. 2004. pp. 849-852.
Kim, Doh-Suk. "ANIQUE: An Auditory Model for Single-Ended Speech Quality Estimation." IEEE Transactions on Speech and Audio Processing, vol. 13, No. 5, Sep. 2005. pp. 821-831.
Study Group 12—Contribution 94. "Continuous Assessment of Time-Varying Subjective Vocal Quality and Its Relationship With Overall Subjective Quality." Question 14/12. International Telecommunication Union, Telecommunication Standardization Sector, Study Period 1997-2000, Jul. 1999. pp. 1-18.
Wang, Shihua et al.: "An Objective Measure for predicting Subjective Quality of Speech Coders.", IEEE Journal on selected areas in communications, IEEE Service Center, Piscataway, NJ, US, vol. 10 No. 5, Jun. 1, 1992, pp. 819-829, XP000274717, ISSN: 0733-8716.
International Search Report and Written Opinion dated Oct. 27, 2006.
Lucent Technologies, "ANIQUE: Lucent Technologies' candidate algorithm for ITU-T single-ended speech quality assessment model," International Telecommunication Union, Telecommunication Standardization Sector, Geneva, Sep. 22-30, 2003.

\* cited by examiner

SPEECH QUALITY ASSESSMENT METHOD AND SYSTEM

BACKGROUND OF THE INVENTION

1. Field of the Invention

The present invention relates to speech quality assessment.

2. Description of Related Art

As modern telecommunication networks are becoming more complex and are evolving from circuit-switched networks to packet-based networks such as voice over internet protocol (VoIP), new types of distortion affecting perceived speech quality are being encountered. Thus, maintaining and improving the quality of service (QoS) of in-service networks continues to be an important issue. In the current art, subjective speech quality assessment is the most reliable and commonly accepted way for evaluating the quality of speech. In subjective speech quality assessment, human listeners are used to rate the speech quality of processed speech, wherein processed speech is a transmitted speech signal which has been processed, e.g., decoded, at the receiver. This technique is subjective because it is based on the perception of the individual human. However, subjective speech quality assessment is an expensive and time consuming technique because sufficiently large number of speech samples and listeners are necessary to obtain statistically reliable results. These subjective results, for example, rating speech quality on a scale of 1 to 5 are averaged to obtain a mean opinion score (MOS).

Objective speech quality assessment is another technique for assessing speech quality. Unlike subjective speech quality assessment, objective speech quality assessment is not based on the perception of the individual human. Objective speech quality assessment may be one of two types. The first type of objective speech quality assessment is based on known source speech, and is often referred to as an intrusive assessment. In this first type of objective speech quality assessment, for example, a mobile station transmits a speech signal derived, e.g., encoded, from known source speech. The transmitted speech signal is received, processed and subsequently recorded. The recorded processed speech signal is compared to the known source speech using well-known speech evaluation techniques, such as Perceptual Evaluation of Speech Quality (PESQ), to determine speech quality. If the source speech signal is not known or the transmitted speech signal was not derived from known source speech, then this first type of objective speech quality assessment cannot be utilized.

The second type of objective speech quality assessment is not based on known source speech and is referred to as non-intrusive, single-ended or output-based. Most embodiments of this second type of objective speech quality assessment involve estimating source speech from processed speech, and then comparing the estimated source speech to the processed speech using well-known speech evaluation techniques. Non-intrusive methods have great potential in real applications, e.g., monitoring the speech quality of in-service networks, where the source speech signal is not available. Some attempts have been made to build non-intrusive measurement systems by measuring the deviation of feature vectors of the degraded speech signal from a set of codewords derived from un-degraded source speech databases, or by the parameterization of a vocal tract model which is sensitive to telecommunication network distortions. Recently in the ITU-T, a standardization activity called P.SEAM (Single-Ended Assessment Models) was created to standardize an algorithm for non-intrusive estimation of speech quality. Several models were proposed and one of them was adopted as a standard recommendation P.563. However, the ITU-T P.563 model shows very limited performance even for the known MOS data used in the development of the model—average of about 0.88 correlation between subjective and objective scores for 24 MOS tests.

SUMMARY OF INVENTION

The present invention provides an objective speech quality assessment.

In one embodiment, distortion in a received speech signal is estimated using at least one model trained based on subjective quality assessment data. A speech quality assessment for the received speech signal is then determined based on the estimated distortion.

For example, the estimating step may include estimating speech distortion in the received speech signal using a first model trained based on the subjective quality assessment data. The estimating step may further include estimating background noise distortion in the received speech signal using the first model trained based on the subjective quality assessment data.

The first model may model a subjective determination of distortion in speech signals.

The estimating step may also further include estimating distortion caused by mutes in the received speech signal using a second model trained based on the subjective quality assessment data.

In another embodiment of the present invention, an apparatus for speech quality assessment includes at least one estimator estimating distortion in a received speech signal using at least one model trained based on subjective quality assessment data, and a mapping unit mapping the estimated distortion to a speech quality metric.

Yet another embodiment of the present invention provides a method of estimating frame distortion. In this embodiment, speech distortion in a received signal is estimated using a model trained based on subjective quality assessment data, and background noise distortion in the received signal is estimated using the model trained based on the subjective quality assessment data. The estimated speech distortion and the estimated background noise distortion are combined to obtain a frame distortion estimate.

A further embodiment of the present invention provides a method of estimating mute distortion. In this embodiment, mutes in a received speech signal are detected, and distortion caused by the detected mutes are estimated using a model trained based on subjective quality assessment data.

The present invention further includes a method of training a quality assessment system. In embodiment, the method includes training a first distortion estimation path of the system while excluding impact from a second distortion estimation path of the system using first subjective quality assessment data. The first subjective quality assessment data includes first speech signals and first associated subjective quality metrics, and the first speech signals lack mute distortion. Then, the second distortion estimating path of the system is trained using second subjective quality assessment data. The second subjective quality assessment data includes second speech signals and second associated subjective quality metrics, and the second speech signals include mute distortion. The first distortion path, while including the impact of the second distortion path, is then retrained using the first and second quality assessment data.

BRIEF DESCRIPTION OF DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF EXAMPLE EMBODIMENTS

Figure 1:
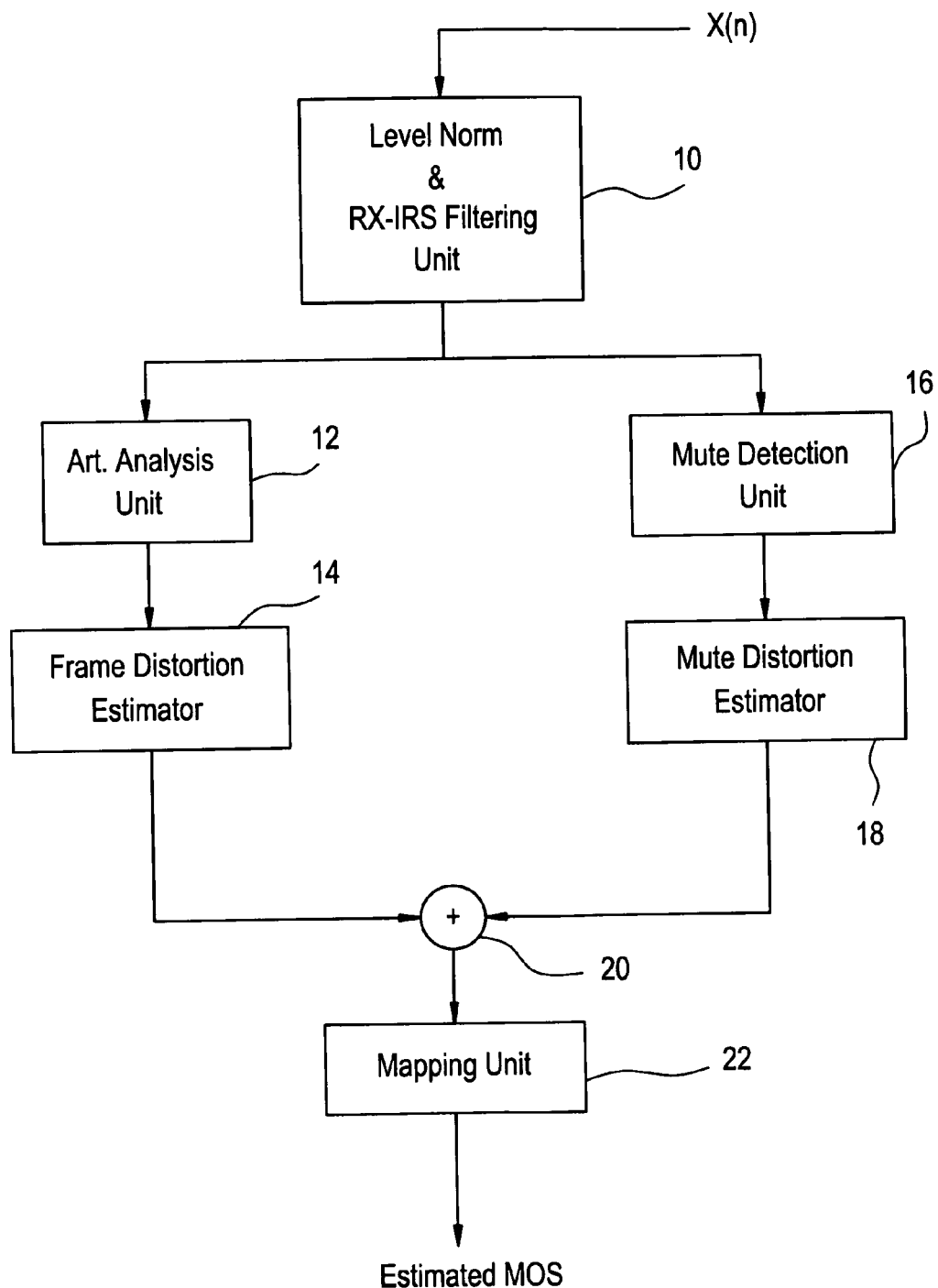
FIG. 1 illustrates a block diagram of a speech quality assessment system according to an embodiment of the present invention.

FIG. 1 illustrates a block diagram of a speech quality assessment system according to an embodiment of the present invention. As shown, a filter 10 performs level normalization and modified receive intermediate reference system (RX-IRS) filtering on a speech signal x(n). The filter 10 normalizes the speech signal x(n) to −26 dBov using the well-known P.56 speech voltmeter. Then, well-known RX-IRS filtering that reflects the characteristics of the handset used in subjective listing tests is applied by the filter 10. Because both the normalization and RX-IRS filtering is well-known, these operations will not be described in detail.

The normalized and filtered speech signal undergoes articulation analysis by an articulation analysis unit 12. The articulation analysis unit 12 generates feature vectors, each of which includes an average articulation power component, which reflects signal components relevant to natural human speech, and an average non-articulation power component, which reflects perceptually annoying distortions produced at rates beyond the speed of human articulation systems. A frame distortion estimator 14 then estimates the speech distortion and background noise distortion for each frame m based on the feature vector for each frame m. The frame distortion estimator 14 accumulates the speech and background distortions for a number of frames and normalizes the accumulated speech and background noise distortions to produce a frame distortion. The operation of the frame distortion estimator 14 will be described in detail below.

The filtered speech signal from the filter 10 is also supplied to a mute detection unit 16. The mute detection unit 16 detects mutes, which are unexpected and unwanted pauses caused by, for example, packet loss. More specifically, the mute detection unit 16 detects the location of mutes in time and the length (also referred to as the depth) of the mute. The operation of the mute detection unit 16 will described in detail below.

A mute distortion estimator 18 receives the information from the mute detection unit 16, and estimates the perceptual distortion caused by the mutes (hereinafter referred to as the "mute distortion"). The operation of the mute distortion estimator 18 will be described in detail below.

Figure 2:
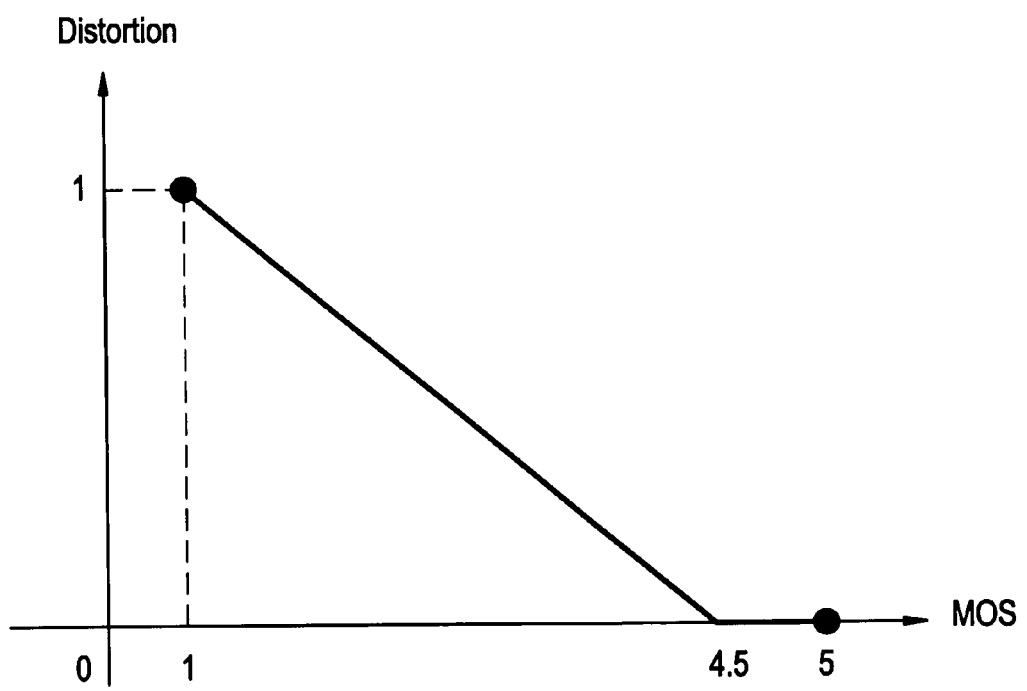
FIG. 2 illustrates a curve of estimated objective distortion to MOS represented by the look-up table.

A combiner 20 combines the frame and mute distortion estimates to produce an objective distortion estimate. A mapping unit 22 maps the objective distortion estimate to a corresponding subjective speech quality figure of merit such as an MOS. For example, the mapping unit 22 may store a look-up table for converting the objective distortion estimate to an MOS. For values lying between distortion estimate points in the look-up table, an interpolation may be performed to obtain the MOS. FIG. 2 illustrates a curve of estimated objective distortion to MOS represented by the look-up table. As an alternative, the mapping unit 22 may store an equation characterizing the curve in FIG. 2, and apply the estimated objective distortion as an input to the equation to obtain the resulting MOS. For example, with respect to FIG. 2, the MOS value Qx may equal (−3.5*objective distortion estimate +4.5) such that the maximum MOS is 4.5 and the minimum MOS is 1.0

Next, the operation of the articulation analysis unit 12, the frame distortion estimator 14, the mute detection unit 16 and the mute distortion estimator 18 will be described.

Articulation Analysis Unit

Figure 3:
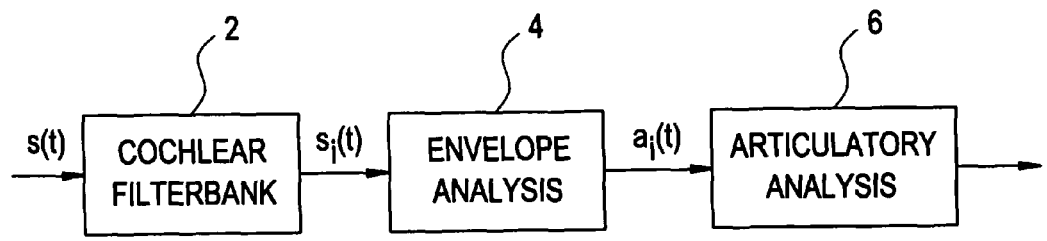
FIG. 3 depicts a speech quality assessment arrangement employed in the articulatory analysis unit in accordance with an embodiment of the present invention.

FIG. 3 depicts a speech quality assessment arrangement employed in the articulatory analysis unit of FIG. 1 in accordance with an embodiment of the present invention. The speech quality assessment arrangement comprises of cochlear filterbank 2, envelope analysis module 4 and articulatory analysis module 6. In the speech quality assessment arrangement, the normalized and RX-IRS filtered speech signal s(t) is provided as input to the cochlear filterbank 2. The cochlear filterbank 2 comprises a plurality of cochlear filters $h_i(t)$ for processing speech signal s(t) in accordance with a first stage of a peripheral auditory system, where i=1, 2, ..., $N_c$ represents a particular cochlear filter channel and $N_c$ denotes the total number of cochlear filter channels. Specifically, the cochlear filterbank 2 filters speech signal s(t) to produce a plurality of critical band signals $s_i(t)$, wherein critical band signal $s_i(t)$ is equal to $s(t)*h_i(t)$.

The plurality of critical band signals $s_i(t)$ is provided as input to envelope analysis module 4. In envelope analysis module 4, the plurality of critical band signals $s_i(t)$ are processed to obtain a plurality of envelopes $a_i(t)$, wherein $a_i(t)=\sqrt{s_i^2(t)+\hat{s}_i^2(t)}$ and $\hat{s}_i(t)$ is the Hilbert transform of $s_i(t)$.

The plurality of envelopes $a_i(t)$ is then provided as input to the articulatory analysis module 6. In the articulatory analysis module 6, the plurality of envelopes $a_i(t)$ are processed to obtain a speech quality assessment for speech signal s(t). Specifically, the articulatory analysis module 6 generates a feature vector based on the power associated with signals generated from the human articulatory system (hereinafter referred to as "articulation power $P_A(m,i)$") with the power associated with signals not generated from the human articulatory system (hereinafter referred to as "non-articulation power $P_{NA}(m,i)$").

Figure 4:
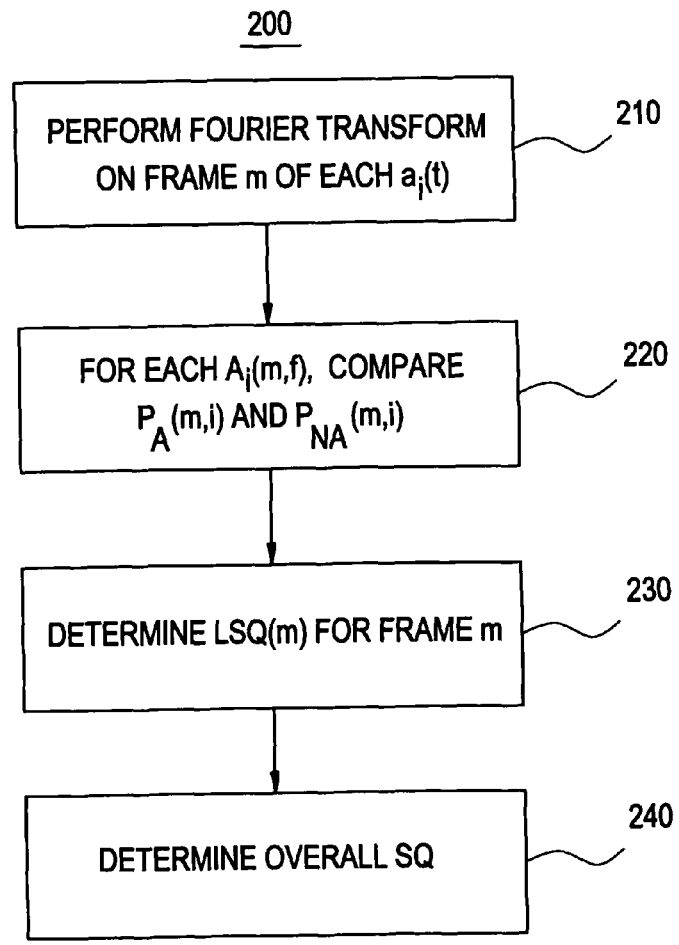
FIG. 4 depicts a flowchart for processing, in the articulatory analysis module of FIG. 3, the plurality of envelopes $a_i(t)$ in accordance with one embodiment of the invention.

FIG. 4 depicts a flowchart 200 for processing, in articulatory analysis module 6, the plurality of envelopes $a_i(t)$ in accordance with one embodiment of the invention. In step 210, Fourier transform is performed on frame m of each of the plurality of envelopes $a_i(t)$ to produce modulation spectrums $A_i(m,f)$, where f is frequency.

Figure 5:
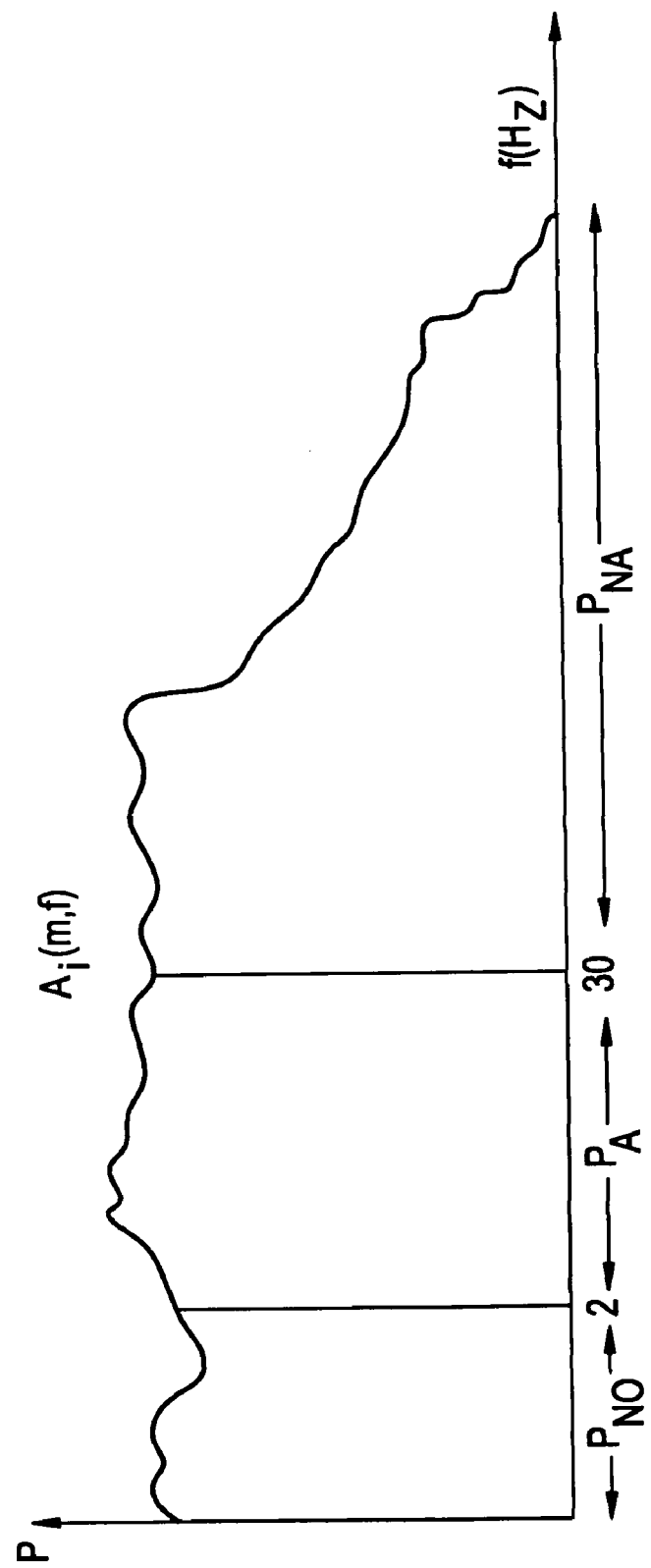
FIG. 5 depicts an example illustrating a modulation spectrum $A_i(m,f)$ in terms of power versus frequency.

FIG. 5 depicts an example illustrating a modulation spectrum $A_i(m,f)$ in terms of power versus frequency. As shown, articulation power $P_A(m,i)$ is the power associated with frequencies 2~30 Hz, and non-articulation power $P_{NA}(m,i)$ is the power associated with frequencies greater than 30 Hz. Power $P_{No}(m,i)$ associated with frequencies less than 2 Hz is the DC-component of frame m of critical band signal $a_i(t)$. In this example, articulation power $P_A(m,i)$ is chosen as the power associated with frequencies 2~30 Hz based on the fact that the speed of human articulation is 2~30 Hz, and the frequency ranges associated with articulation power $P_A(m,i)$ and non-articulation power $P_{NA}(m,i)$ (hereinafter referred to respectively as "articulation frequency range" and "non-articulation frequency range") are adjacent, non-overlapping frequency ranges. It should be understood that, for purposes of this application, the term "articulation power $P_A(m,i)$" should not be limited to the frequency range of human articulation or the aforementioned frequency range 2~30 Hz. Likewise, the term "non-articulation power $P_{NA}(m,i)$" should not be limited to frequency ranges greater than the frequency range associated with articulation power $P_A(m,i)$. The non-articulation frequency range may or may not overlap with or be adjacent to the articulation frequency range. The non-articulation frequency range may also include frequencies less than the lowest frequency in the articulation frequency range, such as those associated with the DC-component of frame m of critical band signal $a_i(t)$.

A feature vector $\xi_k(m)$ is then defined as:

$$\xi_k(m) = [\psi_{k,A}(m), \psi_{k,N}(m)] \quad (1)$$

where $$\psi_{k,A}(m) = \frac{1}{L_A}\sum_{i=1}^{L_A} P_A(m,i) \quad (2)$$

is the average articulation power reflecting signal components relevant to natural human speech, and $$\psi_{k,A}(m) = \frac{1}{L_N(k) - L_A}\sum_{i=L_A+1}^{L_N(k)} P_{NA}(m,i) \quad (3)$$

is the average nonarticulation power representing perceptually annoying distortions produced at the rates beyond the speed of human articulation systems. In order to cover the frequency range of 2-30 Hz, corresponding to the movement speed of human articulation system, LA in equations (2) and (3) is, for example, set as 4. For the computation of average nonarticulation power $\psi_{k,N}(m)$, the modulation band power from the $(L_A+1)$th up to $L_N(k)$-th band is considered as can be seen in equation (3). This means that the highest modulation frequency in estimating the nonarticulation power is chosen different for different critical bands (note $L_N$ is a function of k). The reason for this is based on the investigation performed by Ghitza on the upper cutoff frequency of the critical-band envelope detectors. In his psychophysical experiments, it was shown that in a given auditory channel the minimum bandwidth of the envelope information required to preserve speech quality is roughly one-half of critical bandwidth of that channel. This implies that modulation frequency components only up to the half of critical bandwidth are relevant to the perception of speech quality. Thus, $L_N(k)$ is determined such that the modulation filter channels considered in calculating $\psi_{k,N}(m)$ cover approximately up to half of the critical bandwidth.

Frame Distortion Estimator

Figure 6:
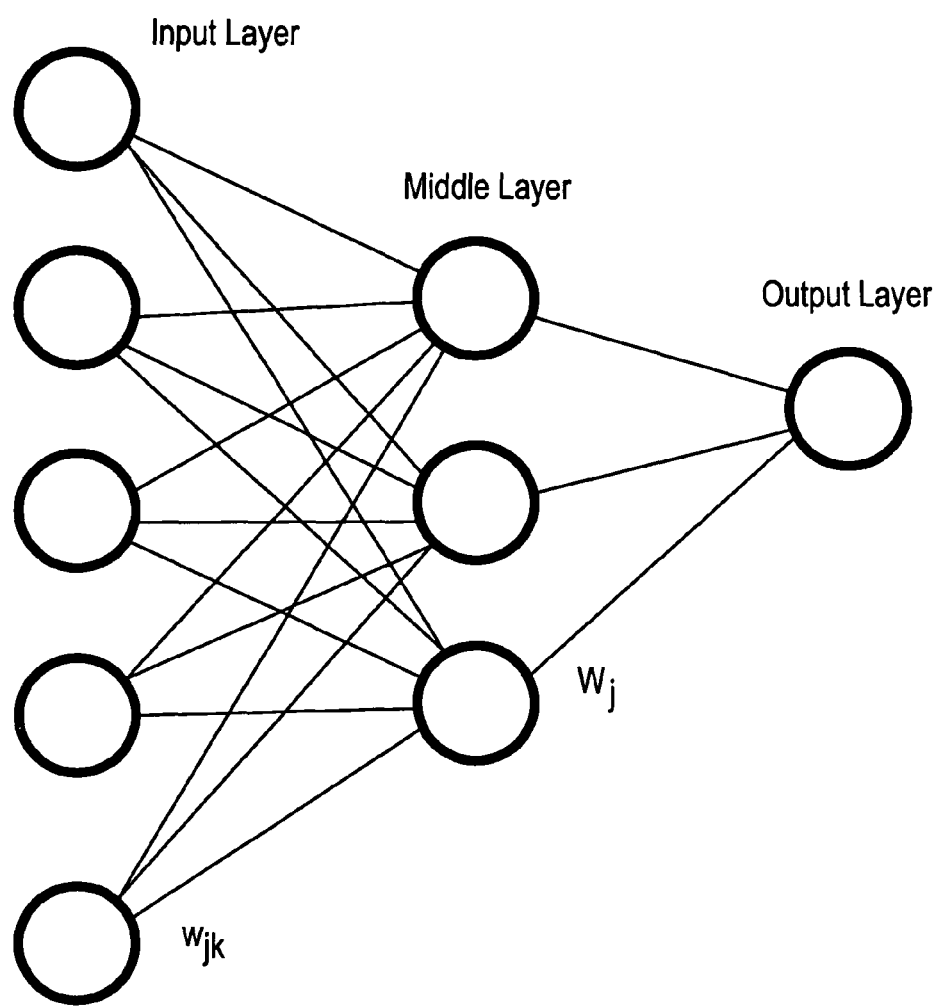
FIG. 6 illustrates an example of a multi-layer perceptron such as used in the frame distortion estimator of FIG. 1.

The frame distortion estimator 14 receives the feature vector $\xi_k(m)$ for each frame m from the articulation analysis unit 12. By using the feature vector for each frame as the input to a neural network; for example, a multi-layer perceptron, forming a portion of the frame distortion estimator 14, the objective distortion of each frame is estimated by the multi-layer perceptron. FIG. 6 illustrates an example of a multi-layer perceptron such as used in the frame distortion estimator 14. The output of multi-layer perceptron O(m) for the input vector at the m-th frame $\xi_k(m)$ is expressed as:

$$O(m) = g\left(\sum_j W_j g\left(\sum_k w_{jk}\xi_k(m)\right)\right) \quad (4)$$

where $w_{jk}$ and $W_j$ are connection weights for the input and hidden layer, respectively, and g(x) is the nonlinear sigmoid function. The m-th frame distortion for speech $D_s(m)$ is accumulated over time and then normalized by the total number of speech frames $T_s$, to come up with the speech distortion $D_s$. As the background noise also affects the perceived quality of speech, the frame distortion $D_V$, is modeled by the sum of speech distortion $D_s$ and background noise distortion $D_b$ (also accumulated and normalized by the total number of background noise or non-articulation frames $T_b$), as expressed by:

$$D_v = D_s + D_b \quad (5)$$
$$= \frac{1}{T_s}\sum_{m\in S} O(m) + \frac{1}{T_b}\sum_{m\in B}\{\alpha(P_b(m) - P_{th}) + \beta\}O(m)$$

where $P_b(m)$ is the energy of the signal at the m-th frame, $P_{th}$ is the threshold for audible background noise, and $T_s$ and $T_b$ are the number of frames for speech and background noise, respectively.

As will be appreciated, because the frame distortion estimator 14 is a neural network, a multi-layer perceptron in this embodiment, the neural network is trained to produce meaningful output. The training of the frame distortion-estimator 14 will be described in detail below.

Mute Detection Unit

Modern telecommunication networks are becoming more and more complex. In addition to existing traditional public switched telephone networks (PSTN), various types of networks such as global system for mobile communications (GSM), code-division multiple access (CDMA), universal mobile telecommunication system (UMTS), and voice over internet protocol (VoIP) are widely used in daily life or are about to be deployed over the globe. As telephone networks are evolving from circuit-switched networks to packet networks (especially for VoIP), packet loss and delay jitter are important distortion types degrading the transmitted quality of speech. These types of distortion often produce unwanted mutes in the speech signal.

In the mute detection unit 16, the frame log-power is computed every 4 ms as $$e(l) = 10\log\left[\sum_{n=0}^{63} s^2(l;n)h_w^2(n) + 1\right], \quad (6)$$

where s(l;n) is the l-th frame signal of s(n), which is the output of the filter 10, and $h_w(n)$ is the Hamming window of length 64 (=8 msec for 8 kHz sampling rate). The time-derivative of e(l) is obtained as $$\Delta e(l) = \frac{1}{2}[e(l+1) - (e(l-1)]. \quad (7)$$

Figure 7:
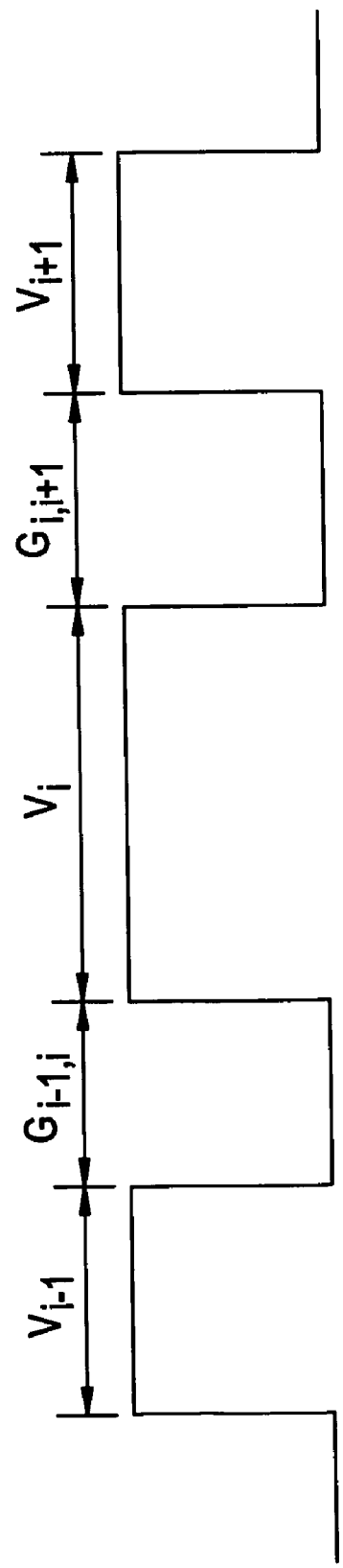
FIG. 7 shows an illustrative example of a profile for voice activity over time.

A voice activity profile is generated by using the value of e(l). FIG. 7 shows an illustrative example of a profile for voice activity over time. As shown, $V_i$ is the duration of a voice activity, $G_{i-1,i}$ is the gap between two adjacent voice activities $V_{i-1}$ and $V_i$.

The frame $l_M$ located at the end of $V_i$ is identified as an abnormal abrupt stop if the following conditions are met:

$$\Delta e(l_M) < \Delta e_{stop} = -7$$

$$L_{stop}(z_{stop}(l_M)) \geq L_{th,stop} = 0.55 \quad (8)$$

where $L_{stop}(z_{stop}(l_M))$ is the output of a neural network detector for abnormal stops with the $z_{stop}(l_M)$ as an input feature vector extracted at two time instances, $l_M$ and 15 ms prior to $l_M$. For each time frame, 12-th order Mel-Frequency Cepstral Coefficients (MFCC) and voicing factor are obtained with the analysis length of 30 ms, to make the dimensions of the input feature vector $z_{stop}(l_M)$ 26. The voicing factor indicates how may periodic components a segment of speech contains, and is defined as the normalized autocorrelation within the pitch period range of 50~400 Hz (which corresponds to 20~160 in time sample):

$$v = \max_{20 \leq k \leq 160} \frac{\sum_n x(n)x(n+k)}{\sum_n x^2(n)}. \quad (9)$$

The neural network detector is the multi-layer perceptron trained on training database as will be discussed in detail below.

The frame $l_M$ located at the beginning of $V_i$ is identified as an abnormal abrupt start if the following conditions are met:

$$\Delta e(l_M) > \Delta e_{start} = 13$$

$$L_{start}(a_{start}(l_M)) \geq L_{th,start} = 0.55 \quad (10)$$

where $L_{start}(z_{start}(l_M))$ is the output of a neural network detector for abnormal starts with the $z_{start}(l_M)$ as an input feature vector extracted at two time instances, $l_M$ and 15 ms after $l_M$. For each time frame, 12-th order Mel-Frequency Cepstral Coefficients (MFCC), voicing factor defined in (9), and spectral centroid are obtained with the analysis length of 30 ms. The spectral centroid is defined as $$s = \frac{\sum_k k|X(k)|}{\sum_k |X(k)|} \quad (11)$$

where |X(k)| is the FFT magnitude of speech segment. The neural network detectors for abnormal stop and start may each be a multi-layer perceptron. For example, the neural network for abrupt stops may have 26 input neurons, at least one hidden layer, and one output neuron. This network is trained to yield a "1" as the output when there is an abrupt stop, and "0" otherwise. Any well-known training algorithm such as a conventional error back propagation algorithm utilizing the gradient of an error cost function may be used. The neural network for abrupt start may be constructed and trained in the same manner to yield a "1" for abrupt starts, and "0" otherwise.

Mute Distortion Estimator

Recent experiments have also revealed that humans can assess the quality of speech continuously over time and that there are some recency effects in perceived overall quality. Namely, the more recent the distortion (e.g., unwanted mute), the greater the impact on speech quality. This is related to biological short-term memory and means that recent events can play more of a role than past ones. Although there is no known mechanism, the model according to this embodiment of the present invention models the impact of mutes as the combination of abrupt instantaneous distortion followed by decays simulating short-term memory effects. Accordingly, as shown below, besides accounting for the mute and its duration, the mute distortion estimator 18 also accounts for recency effects in estimating mute distortion.

Suppose a speech signal contains K mutes and $t_i$, i=1, 2, . . . , M is the time instance when each mute ends. The objective distortion caused by mutes is modeled by the mute distortion estimator 18 as:

$$D_M = \sum_{m=1}^{M} h_m \exp(-(t-t_m)/\tau)u(t-t_m)\Big|_{t=T} \quad (12)$$

where u(x) is a unit step function which is 1 for $x \geq 0$ and 0 for x<0; $h_i$ is the instantaneous distortion of the i-th mute at time ti; T is the length of the speech signal in time; and τ is a time constant for the decay of a mute event's impact over time. For each mute, perceived distortion is raised by the amount of $h_i$ at the end of the mute event and decays over time with the time constant τ. Namely, as equation (12) shows, the later the mute event, the greater the impact on the estimated mute distortion $D_M$.

The instantaneous distortion of the i-th mute $h_i$ is estimated by:

$$h_i = p_1 \log(L_i) + p_2 \quad (13)$$

where $L_i$ is the length of i-th mute, and $p_1$ and $p_2$ are constants determined from training data as will be discussed in detail below.

Training Frame Distortion Estimator and Mute Distortion Estimator

Figure 8A:
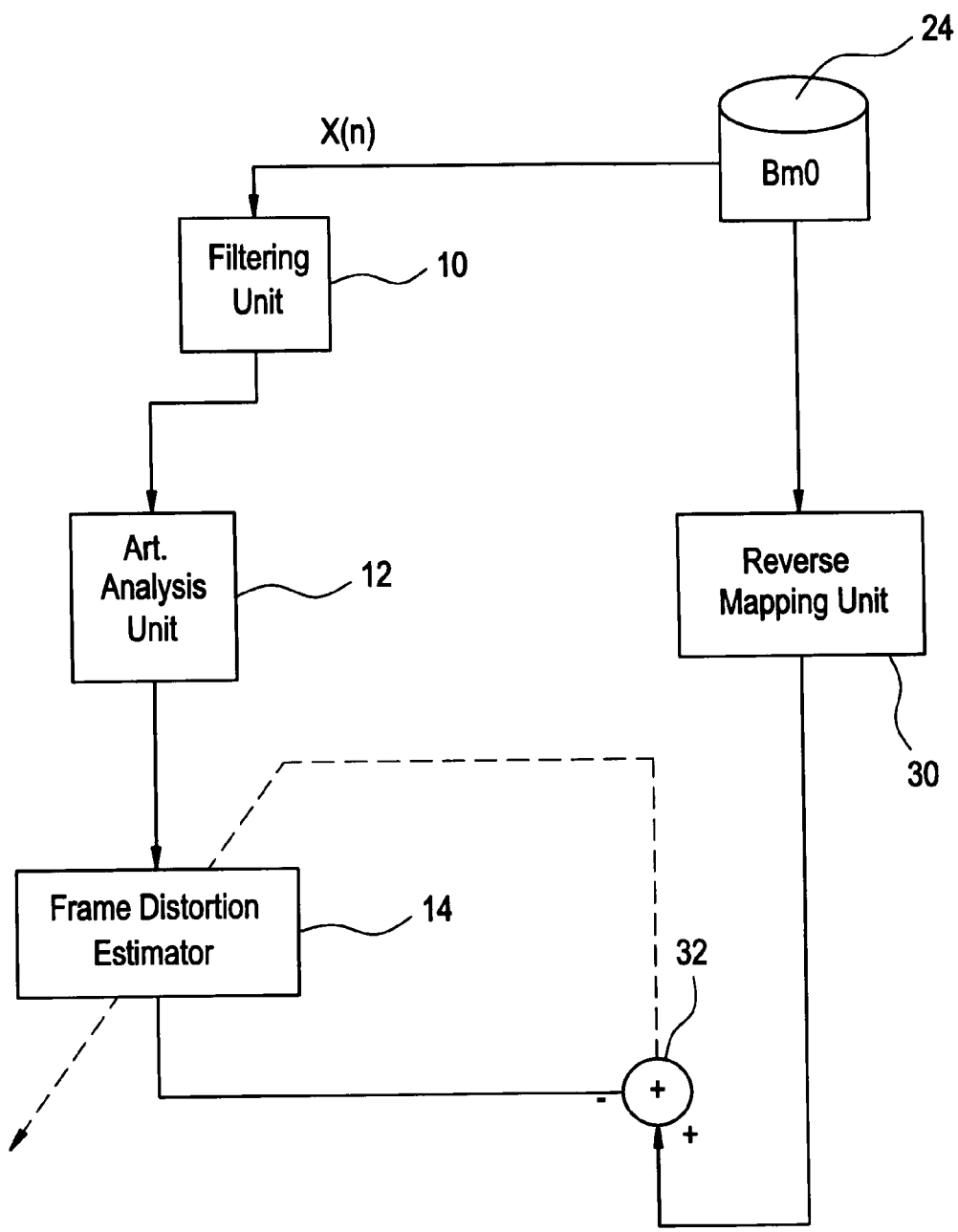
FIGS. 8A-8C illustrate the training of the frame distortion estimator and the mute distortion estimator of FIG. 1.
Figure 8B:
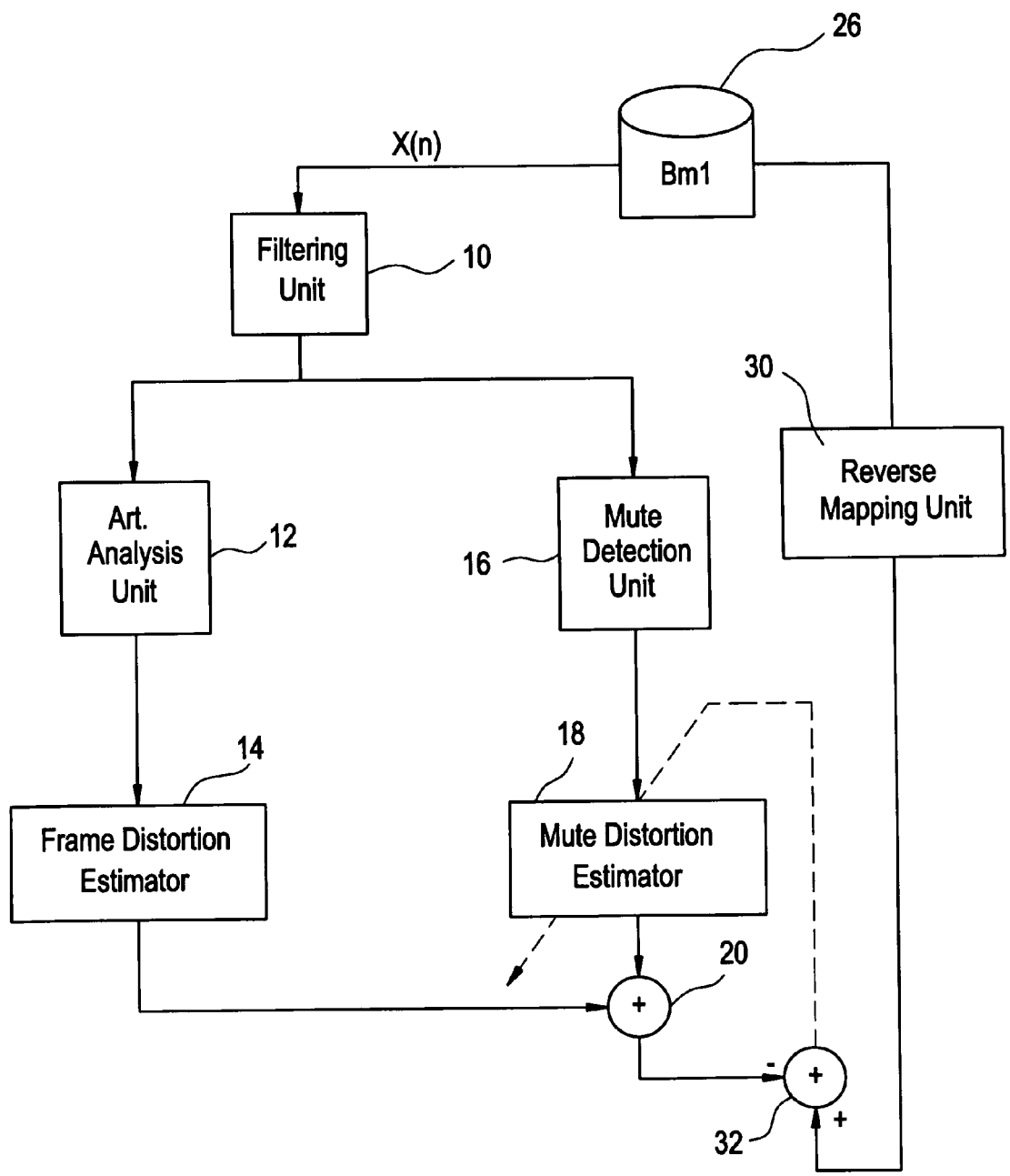
Figure 8C:
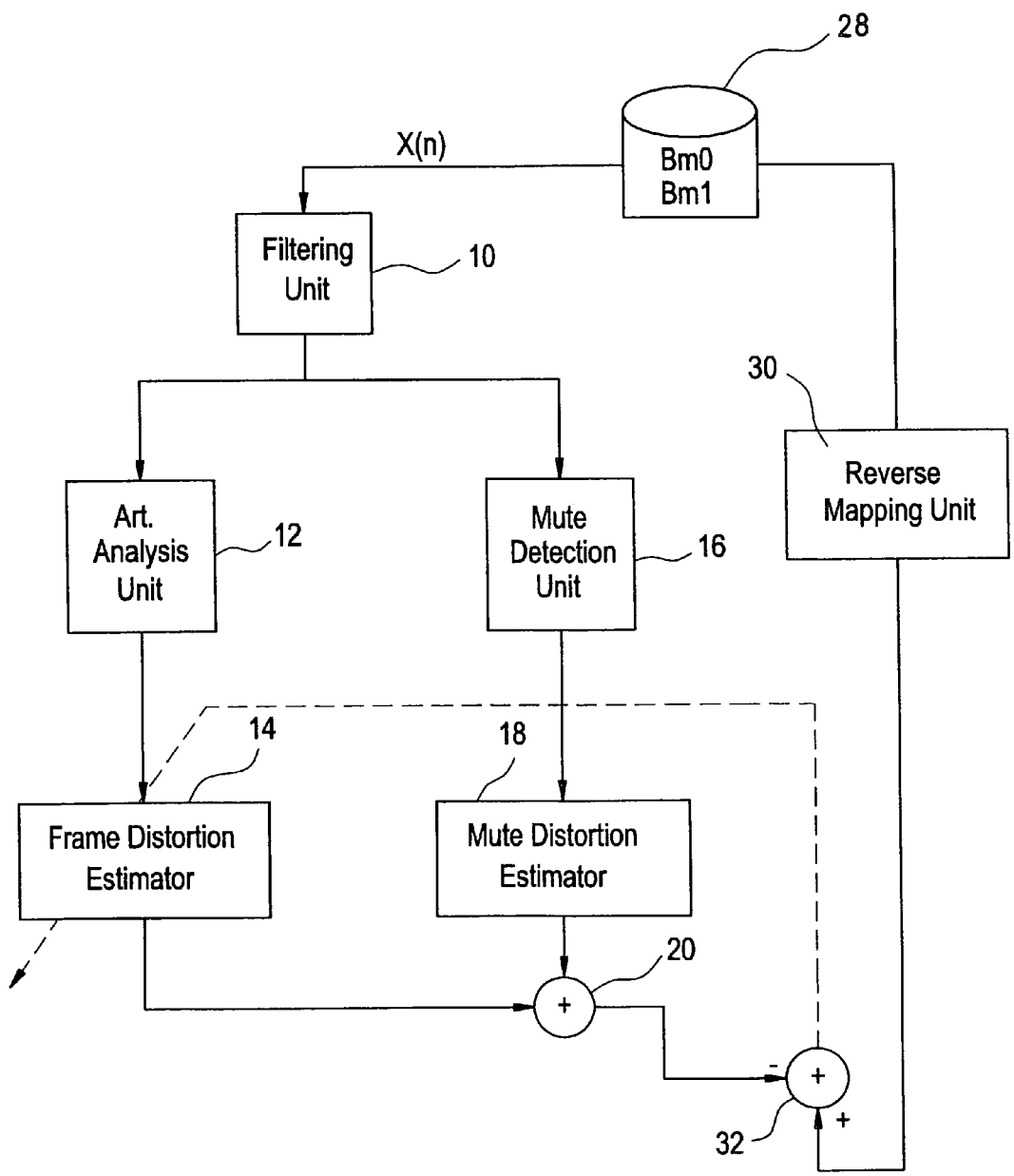

FIGS. 8A-8C illustrate the training of the frame distortion estimator 14 and the mute distortion estimator 18. FIG. 8A illustrates a first step in the training process in which the frame distortion estimator 14 is initially trained. Accordingly, the elements of FIG. 1 that do not participate in this training process have not been shown (e.g., the mute detection unit 16, mute distortion estimator 18, the combiner 20 and the mapping unit 22) for the sake of clarity. As shown, a data base 24 has been provided. The data base 24 includes a plurality of speech signals and their associated subjective MOS determined in the well-known manner. The speech signals in the data base 24 may contain distortion but not temporal discontinuity (e.g., mute) distortion.

Each speech signal in the data base (or at least a subset thereof) is supplied to the filter 10. The corresponding subjective MOS is supplied to a reverse mapping unit 30, which converts the MOS into subjective distortion. The conversion operation of the reverse mapping unit 30 is the opposite of the conversion operation performed by the mapping unit 22. Accordingly, the reverse mapping unit 30 performs the conversion using a look-up table, equation, or etc. For example, with reference to FIG. 2, the reverse mapping equation may be that the subjective distortion equals $-(\min(MOS^{(p)}, 4.5) - 4.5)/3.5$ where $MOS^{(p)}$ is the MOS of the $p^{th}$ speech signal in the database.

The filter 10, articulation analysis unit 12 and the frame distortion estimator 14 operate as discussed above with respect to FIG. 1 except that the weights $W_j$ and $w_{jk}$ of the frame distortion estimator 14 are initially set to very small random numbers. An error generator 32 receives the frame distortion estimate and the subjective distortion from the reverse mapping unit 30 and generates an error signal. More specifically, in one embodiment, the error generator 32 subtracts the frame distortion estimate from the subjective distortion to generate the error signal.

The frame distortion estimator 14 is trained by minimizing the accumulated squared difference over entire training samples between the subjective distortion Dsbj and the objective frame distortion estimate $D_V^{(p)}$ produced by the following distortion model $\hat{\lambda}_V$, such that:

$$\hat{\lambda}_V = \arg\min_{\lambda_V} \sum_p \left[ D_v^{(p)} \mid \lambda_V - D_{sbj}^{(p)} \right]^2 \quad (14)$$

where the superscript (p) denotes the p-th speech signal. The cost function to be minimized in (14) may be expressed by using (5) as:

$$E = \sum_p \frac{1}{2} \left[ D_{sbj}^{(p)} - D_v^{(p)} \right]^2 \quad (15)$$

$$= \sum_p \frac{1}{2} \left[ \begin{array}{c} D_{sbj}^{(p)} - \frac{1}{T_s^{(p)}} \sum_{m \in S} O^{(p)}(m) - \frac{1}{T_b^{(p)}} \sum_{m \in B} \\ \{\alpha(P_b^{(p)}(m) - P_{th}) + \beta\} O^{(p)}(m) \end{array} \right]^2$$

Taking the gradient descent rule gives the update rules at the t-th step as:

$$\alpha(t) = \alpha(t-1) - \eta \frac{\partial E}{\partial \alpha} \quad (16)$$

$$= \alpha(t-1) + \eta \sum_p \left[ D_{sbj}^{(p)} - D_v^{(p)} \right] \frac{1}{T_b^{(p)}}$$

$$\sum_{m \in B} (P_b^{(p)}(m) - P_{th}) O^{(p)}(m)$$

$$\beta(t) = \beta(t-1) - \eta \frac{\partial E}{\partial \beta} \quad (17)$$

$$= \beta(t-1) + \eta \sum_p \left[ D_{sbj}^{(p)} - D_v^{(p)} \right] \frac{1}{T_b^{(p)}} \sum_{m \in B} O^{(p)}(m)$$

and the weights are updated as:

$$W_j(t) = W_j(t-1) - \eta \frac{\partial E}{\partial W_j} \quad (18)$$

$$= W_j(t-1) + \eta \sum_p \left[ D_{sbj}^{(p)} - D_v^{(p)} \right]$$

$$\left[ \begin{array}{c} \frac{1}{T_s^{(p)}} \sum_{m \in S} g'(r^{(p)}(m)) V_j^{(p)}(m) + \frac{1}{T_b^{(p)}} \sum_{m \in B} \\ \{\alpha(P^{(p)}(m) - P_{th}) + \beta\} g'(r^{(p)}(m)) V_j^{(p)}(m) \end{array} \right]$$

$$w_{jk}(t) = w_{jk}(t-1) - \eta \frac{\partial E}{\partial w_{jk}} \quad (19)$$

$$= w_{jk}(t-1) + \eta \sum_p \left[ D_{sbj}^{(p)} - D_v^{(p)} \right]$$

$$\left[ \begin{array}{c} \frac{1}{T_s^{(p)}} \sum_{m \in S} g'(r^{(p)}(m)) W_j g'(q_j^{(p)}(m)) \xi_k^{(p)}(m) + \\ \frac{1}{T_b^{(p)}} \sum_{m \in B} \{\alpha(P^{(p)}(m) - P_{th}) + \beta\} \\ g'(r^{(p)}(m)) W_j g'(q_j^{(p)}(m)) \xi_k^{(p)}(m) \end{array} \right]$$

where:
$$c^{(p)}(m) = \alpha(P^{(p)}(m) - P_{th}) + \beta$$

$$q^{(p)}(m) = \sum_k w_{jk} \xi_k^{(p)}(m) \quad (20)$$

$$V_j^{(p)}(m) = g\left( \sum_k w_{jk} \xi_k^{(p)}(m) \right)$$

$$= g(q^{(p)}(m))$$

$$r^{(p)}(m) = \sum_j W_j g\left( w_{jk} \xi_k^{(p)}(m) \right)$$

$$= \sum_j W_j V_j^{(p)}(m)$$

until the cost function (15) reaches a pre-defined error bound.

This is a mixture of supervised and unsupervised training, where the overall target for a speech file consisting of a sequence of input frames is provided but the individual target for each frame is not given. With a sufficiently large amount of consistent speech samples, the training process can derive a frame distortion model that learns inherent rules relating frame feature vectors to frame quality.

After initial training of the frame distortion estimator 14, the mute impact model of the mute distortion estimator 18 is trained. FIG. 7B illustrates this step of the training process. The elements of FIG. 1 that do not participate in this training process have not been shown (e.g., the mapping unit 22) for the sake of clarity. As shown, a data base 26 has been provided. The data base 26 includes a plurality of speech signals and their associated subjective MOS determined in the well-known manner. The speech signals in the data base 24 may contain distortion that does include temporal discontinuity (e.g., mute) distortion.

Each speech signal in the data base (or at least a subset thereof) is supplied to the filter 10. The corresponding subjective MOS is supplied to the reverse mapping unit 30, which converts the MOS into distortion. The filter 10, articulation analysis unit 12 and the frame distortion estimator 14 operate as discussed above with respect to FIG. 1 except that the weights $W_j$ and $w_{jk}$ of the frame distortion estimator 14 are as trained in the first step of the training process. Also, the mute detection unit 16 and the mute distortion estimator 18 operate as discussed above with respect to FIG. 1. In this training step, the combiner 20 is included in the training loop, and supplies the combination of the frame and mute distortion estimates to the error signal generator 32. The error generator 32 receives the overall distortion estimate from the combiner 20 and the subjective distortion from the reverse mapping unit 30, and generates an error signal. More specifically, in one embodiment, the error generator 32 subtracts the overall distortion from the subjective distortion to generate the error signal.

The training is to find an optimal parameter set Am, i.e., p1 and p2, in (13) by regression such that $$\hat{\lambda}_M = \arg\min_{\lambda_M} \sum_p [D_v^{(p)}|\hat{\lambda}_V + D_M^{(p)}|\lambda_M - D_{sbj}^{(p)}]^2 \quad (21)$$

where the previously trained frame distortion model $\hat{\lambda}_v$ is used.

The third and final step of the training process is to retrain the frame distortion estimator 14. FIG. 8C illustrates this last training. As shown, a data base 28, which includes the data base 24 and the data base 26, supplies the speech signals and subjective MOS. The error signal from the error generator 32 is supplied to the frame distortion estimator 14. This retraining step allows the frame distortion model to compensate for the residual error of the mute impact model. This is done by minimizing the accumulated squared difference over entire training samples between the subjective distortion Dsbj and the objective frame distortion estimate D.sub.V.sup.(P) produced by the following distortion model {circumflex over (.lamda.)}*.sub.v, such that: .lamda. ^V*=arg .times. .times. min .lamda. V .times. p .times. [D v (p) .times. .lamda. V+DM (p) .times. .lamda. ^M−D sbj (p)] 2 (22) The training can be performed the same as the training step 1 with {circumflex over (.lamda.)}.sub.v as the initial parameters of the model.

As will be appreciated from the above-described embodiments, the speech quality estimation system may be embodied as software running on a computer, a hardwired circuit, a digital signal processor, etc.

The invention being thus described, it will be obvious that the same may be varied in many ways. Such variations are not to be regarded as a departure from the invention, and all such modifications are intended to be included within the scope of the invention.

I claim:

1. A speech quality assessment method, comprising:
   estimating, by a computer, objective frame distortion in a received speech signal at a portion of a speech quality system, the estimated objective frame distortion based on inputting at least one feature vector for each frame of the received speech signal into at least a first model trained based on subjective quality assessment data, the at least one feature vector including articulation power components;
   estimating mute distortion caused by mutes in the received speech signal using a second model trained based on the subjective quality assessment data;
   determining a speech quality assessment for the received speech signal based on the estimated objective frame distortion and the estimated mute distortion; and
   storing the determined speech quality assessment at a portion of the speech quality system,
   retraining the first model based on the estimated objective frame distortion and the estimated mute distortion.

2. The method of claim 1, wherein the objective frame distortion estimating step, further includes:
   estimating objective speech distortion in the received speech signal using the first model trained based on subjective quality assessment data.

3. The method of claim 2, wherein the objective frame distortion estimating step, further includes:
   estimating objective background noise distortion in the received speech signal using the first model trained based on subjective quality assessment data.

4. The method of claim 3, further comprising:
   determining an average articulation power and an average non-articulation power from the received speech signal; and wherein
   the estimating objective speech distortion step estimates the speech distortion using the determined average articulation power, the determined average non-articulation power and the first model; and
   the estimating objective background noise distortion step estimates the background noise distortion using the determined average articulation power, the determined average non-articulation power and the first model.

5. The method of claim 3, wherein the first model models subjective determination of distortion in speech signals.

6. The method of claim 5, wherein the first model is a neural network.

7. The method of claim 1, wherein the estimating mute distortion step, further includes:
   detecting mutes in the received speech signal; and
   estimating distortion caused by the detected mutes.

8. The method of claim 7, wherein,
   the detecting step detects locations and durations of mutes in the received speech signal; and
   the estimating distortion caused by the detected mutes step estimates the mute distortion based on the detected locations and durations.

9. The method of claim 1, wherein the estimating distortion caused by the detected mutes step estimates the mute distortion such that mutes later in the received speech signal have a greater impact than mutes earlier in the received speech signal.

10. The method of claim 1, wherein the first model models subjective determination of distortion in speech signals lacking mute distortion and the second model models subjective determination of mute distortion in speech signals.

11. The method of claim 1, wherein the determining step maps the estimated objective frame distortion to a subjective quality assessment metric.

12. A processing device for speech quality assessment, comprising:
at least one processor to estimate objective frame distortion in a received speech signal, the estimated objective frame distortion based on inputting at least one feature vector for each frame of the received speech signal into at least a first model trained based on subjective quality assessment data, the at least one feature vector including articulation power components, the at least one processor to further estimate mute distortion in the received speech signal using a second model trained based on the subjective quality assessment data; and
a mapping unit mapping the estimated objective frame distortion to a speech quality metric,
wherein the first model is retrained based on the estimated objective frame distortion and the estimated mute distortion.

13. A method of estimating objective frame distortion, comprising:
receiving, by a computer, at least one feature vector for each frame of a received signal at a portion of a speech quality system, the at least one feature vector including articulation power components;
detecting mutes in the received signal;
estimating speech distortion in the received signal using the at least one feature vector for each frame and a first model trained based on subjective quality assessment data;
estimating background noise distortion in the received signal using the at least one feature vector for each frame and the first model trained based on subjective quality assessment data;
estimating mute distortion caused by the detected mutes such that mutes later in the received speech signal have a greater impact than mutes earlier in the received speech signal, using a second model trained based on the subjective quality assessment data;
combining the estimated speech distortion and the estimated background noise distortion to obtain an objective frame distortion estimate;
storing the objective frame distortion estimate at a receiver; and
storing the estimated mute distortion at the receiver,
retraining the first model based on the estimated objective frame distortion and the estimated mute distortion.

14. A method of training a speech quality assessment system, comprising:
training, by a computer, a first distortion estimation path of the system while excluding impact from a second distortion estimation path of the system using first subjective quality assessment data, the first subjective quality assessment data including first speech signals and first associated subjective quality metrics, the first speech signals lacking in mute distortion;
training the second distortion estimating path of the system using second subjective quality assessment data, the second subjective quality assessment data including second speech signals and second associated subjective quality metrics, the second speech signals including mute distortion,
wherein the first distortion estimating path is configured to estimate frame distortion and the second distortion estimating path is configured to estimate mute distortion; and
retraining the first distortion path while including the impact of the second distortion path using the first and second quality assessment data.

* * * * *